INVENTORS
George E. King, Phelan McShane,
Nelson D. Cooper & William R. Harding.
ATTORNEY INVENTORS.
George E. King, Phelan McShane,
Nelson D. Cooper & William R. Harding.
BY
ATTORNEY Nov. 7, 1933.  G. E. KING ET AL  1,934,506
CONTROL SYSTEM
Filed May 6, 1930  3 Sheets-Sheet 3
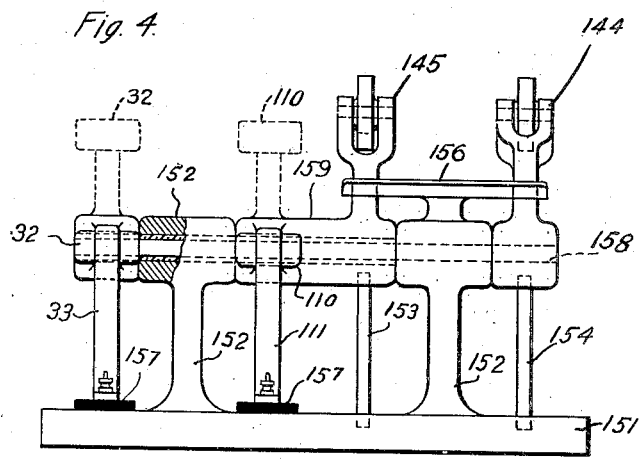
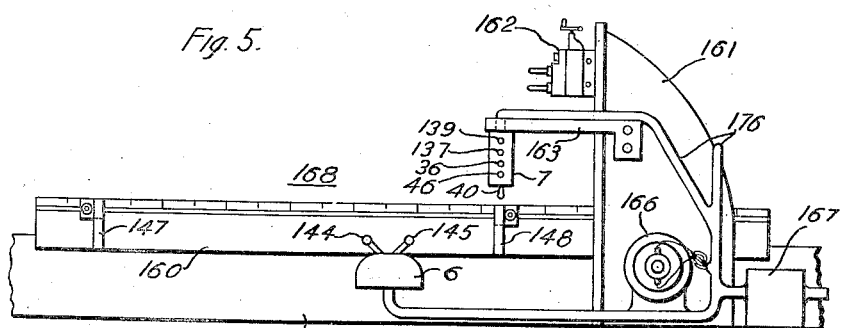
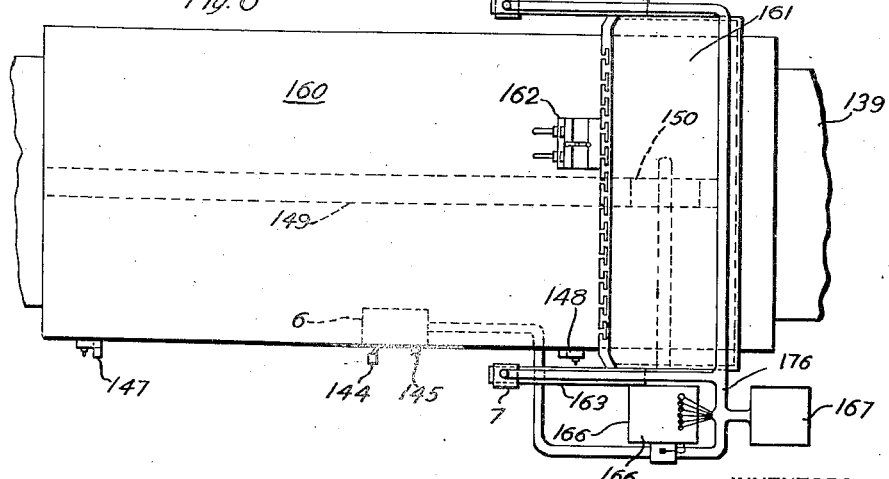
INVENTORS.
George E. King, Phelan McShane,
Nelson D. Cooper & William R. Harding.
BY
ATTORNEY Patented Nov. 7, 1933

1,934,506

UNITED STATES PATENT OFFICE

1,934,506

CONTROL SYSTEM

George E. King, Wilkinsburg, Phelan McShane, Pittsburgh, and Nelson D. Cooper and William R. Harding, Wilkinsburg, Pa., assignors to Westinghouse Electric and Manufacturing Company, a corporation of Pennsylvania Application May 6, 1930. Serial No. 450,102

17 Claims. (Cl. 172—240)

This invention relates to control systems and particularly to control systems for automatically controlling the operation of reversing motors used to drive reciprocating mechanisms, such as planers, draw-cut shapers, roll grinders, transfer tables, etc.

The devices for reciprocating machines made according to the teachings of the prior art embody either a reversing gear, a reversing belt or the combination of a reversing motor with a tumbler mechanism.

The use of a reversing belt to reverse a machine requires a constant-speed overhead shaft, gives very poor control of the limits of travel of the reciprocating member, acceleration cannot be controlled because of belt slippage and the ever-changing belt tension, and the belt slippage makes considerable noise. The reversing gear is inherently subject to clashing and grinding.

A reversing motor having a tumbler mechanism is objectionable because the tumbler mechanism is cumbersome, expensive, dangerous, noisy, subject to premature operation because of chips falling into it, and, for slow speeds, it frequently fails to establish the motor circuit necessary to effect the reverse movement. To provide for the stopping of the reciprocating member within desired limits in the event of voltage failure, elaborate brakes are required and, in some instances, it is necessary to utilize dynamic braking. When dynamic braking circuits are provided, if the line contactors weld and fail to function, the article being worked may shift on the platen, with consequent damage to the article or the machine or both.

This invention has for one of its objects the provision of electrical means, subject selectively to either manual or automatic control, for determining the distance of travel of a reciprocating member, and to fix the stopping position of such member when moving either in a forward or in a reverse direction.

It is also an object of our invention to provide a control system wherein the line contactor for the reversing motor will never be closed on the motor armature circuit by reason of actuation subsequent to the closing of the directional contactors, and where the line contactor will be forced to open position if it fails to open by gravity, upon deenergization of the main control means for the line contactor.

Other objects of the invention are the provision of limit switches actuated directly by dogs on the planer platen, and the provision of a single pendant station from which complete control of the reversing motor is had, or the provision of a plurality of such pendant stations from each of which complete control of the reversing motor may be had.

It is an object of the invention to provide forced acceleration for the motor, thus assuring acceleration of the motor within a substantially predetermined time, regardless of whether the motor be loaded or not during acceleration. The forced acceleration embodies the method of providing the reversing motor with a successively rapidly increasing and rapidly decreasing field during acceleration, the effect of such successive increase and decrease being further enhanced by the shunting of the starting resistor in timed relation to the field changes.

Other objects of the invention are the provision of a limit switch which will have its contacts so placed by the action of a driven reciprocating member that, if travel of the member ceases within the limits of extreme travel, the member may be again set in motion in the desired direction from either one of two push-buttons or some equivalent control device, or multiples thereof, and the provision of means whereby the initial direction of travel of the member will be selectively controlled from a single station or a number of stations, regardless of the position of the reciprocating member.

A further object of this invention is the provision of a reversing motor for driving a reciprocating platen, wherein the speeds of the motor for the forward or cut direction and for the return direction may be adjusted over wide and overlapping ranges, thereby providing a cutting speed in excess of the minimum return speed or a cutting speed that is low relative to the return speed.

Other objects of the invention are the initiation of a dynamic-braking effect in the motor operating the reciprocating device on a field that is comparatively weak but which, by reason of the cumulative action of a shunt winding and a series braking winding, both of low self-induction, builds up very rapidly, thereby producing a low initial retarding torque which smoothly and rapidly rises to a maximum and then, in like manner, drops to zero at standstill of the motor, and the provision of a controller which always establishes the same two-step dynamic-braking circuit, regardless of line-voltage conditions.

From the foregoing objects, it is apparent that the broad objects of this invention are the elimination of the defects inherent in the reversing gear and reversing belt, and the improvement in control and operation of a reversing motor for driving a reciprocating machine.

In the following discussion, the invention is treated in connection with a planer and, more particularly, the planer platen, but the invention is not limited in its use to the control of planers but may be applied generally where rapid reversal of a motor-driven machine is desired.

The novel features of this invention are set forth with particularity in the appended claims. The invention itself, however, both as to its organization and its method of operation, together with additional objects and advantages thereof, will best be understood from the following description of a specific embodiment, when read in connection with the accompanying drawings, in which Fig. 1 is a diagrammatic representation showing, in operative relation, the parts of an electrical control system embodying the invention.

Figs. 3 and 4 are diagrammatic side and end views, respectively, of the limit switch.

Fig. 5 is a side view of the subject matter of the invention, as applied to a planer.

Fig. 6 is a plan view of the subject matter of the invention shown in Fig. 5.

Figure 1:
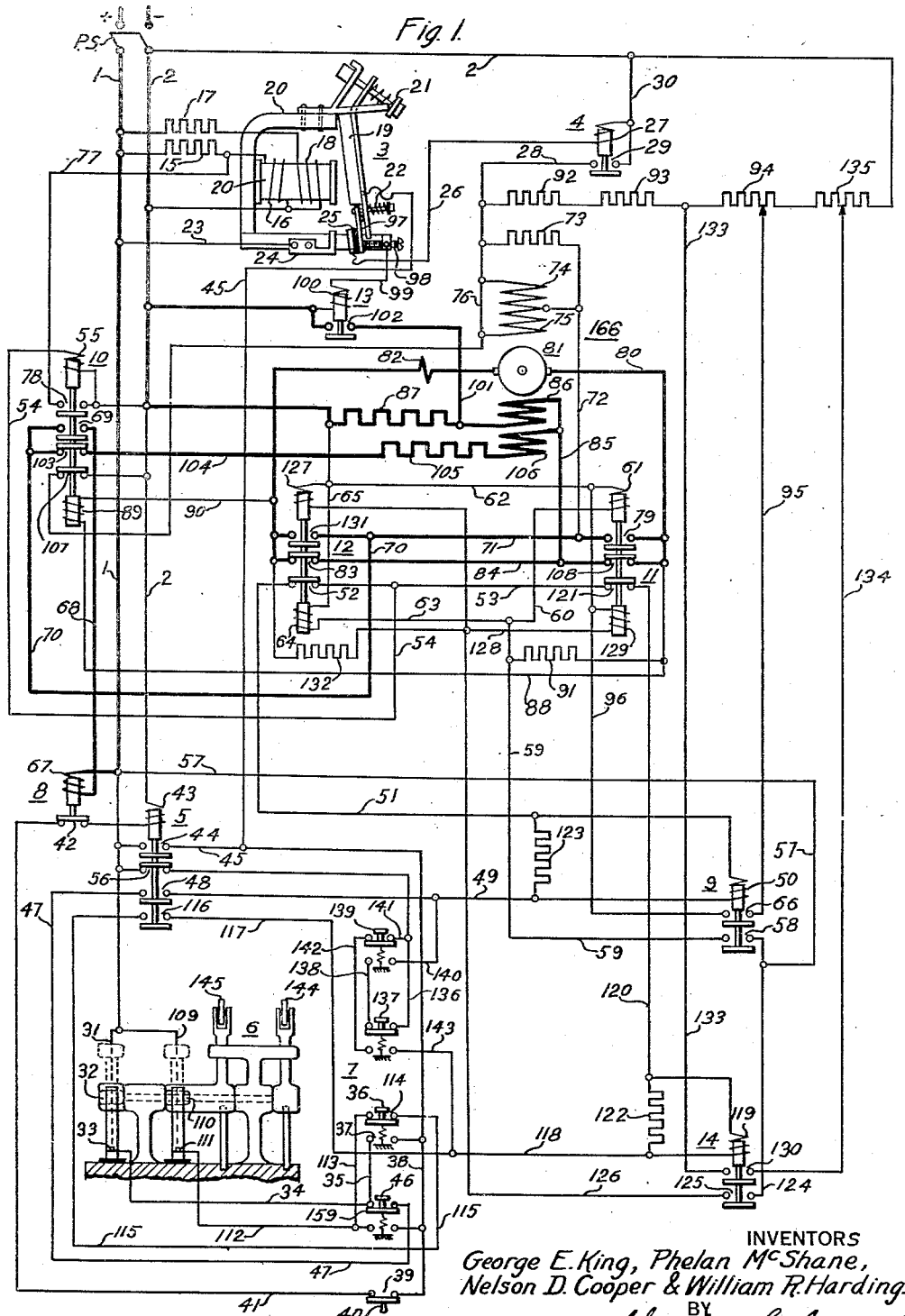
Figure 2:
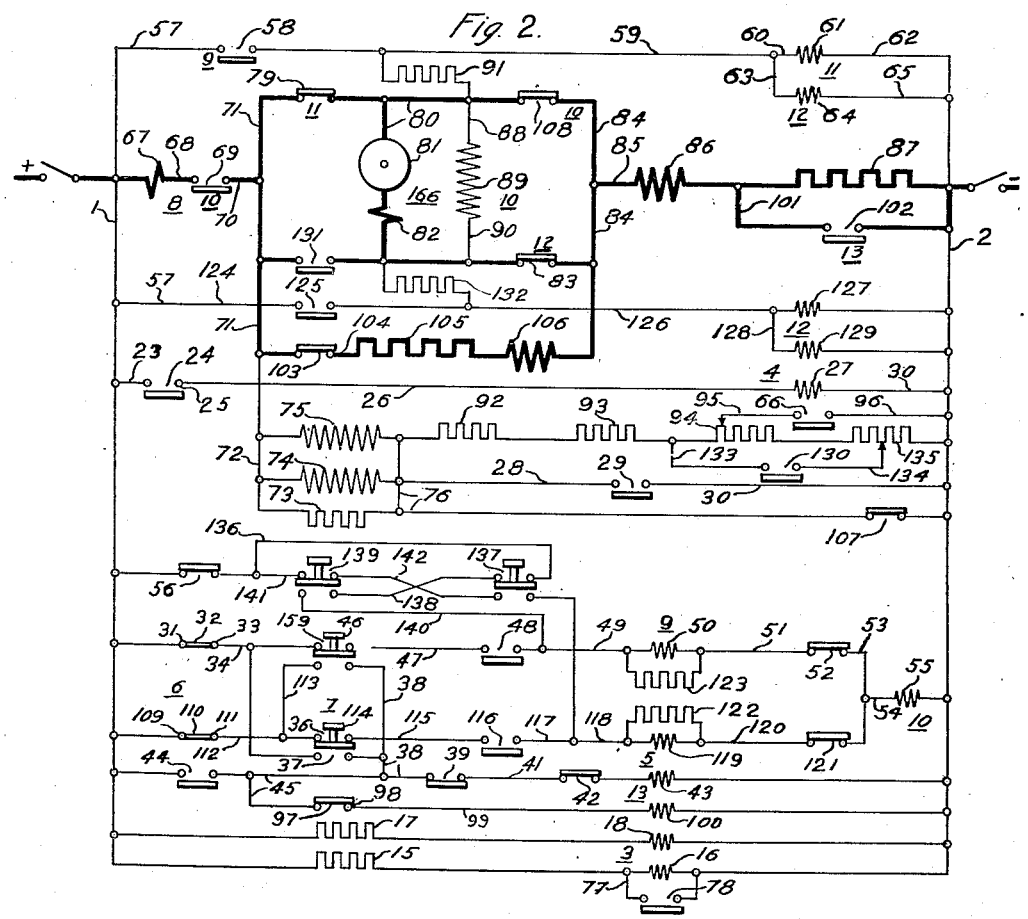
Fig. 2 is a simplified diagram of the subject matter shown in Fig. 1.

Referring more particularly to Figs. 1 and 2, a motor 166 is shown, which is of special design, including shunt field windings comprising coils 74 and 75 connected in parallel-circuit relation, series stabilizing field winding 86, and series dynamic-braking field winding 106. The control panel 167, shown in Figs. 5 and 6, carries the time-limit 3, the main-line contactor relay 10, the directional contactors 11 and 12, the control relays 9 and 14, the overload circuit breaker 8 and the control relays 4, 5 and 13.

The pendant switch, from which complete control of the motor is had, includes the inch cut push-button switch 139, the inch return push-button switch 137, the automatic cut push-button switch 36, the automatic return push-button switch 46 and the stop lever 40. It is to be noted that the depending stop lever 40 is the most accessible part of the pendant switch, and, since the pendant switch is itself located conveniently on the planer, the planer may be stopped very readily. The stopping, whether caused by the stop lever, by the actuation of one of the limit switches or because of voltage failure, is always accomplished by the establishment of the same dynamic-braking circuit for the motor, as will be pointed out more clearly hereinafter.

Any suitable type of pendant switch may be utilized but, preferably, one such as is disclosed in the patent to Phelan McShane, No. 1,736,746, allowed April 29, 1929.

In Figs. 5 and 6, the motor 166 is shown associated with the control panel 167, the planer 168, including among other elements, the table 169, platen 160, crossbar standard 161, and tool holder 162. On the crossbar standard 161, or any other convenient part of the planer, are supported one or more pendant-switch stations 7 from each of which complete control of the motor 166 may be had. The pendant-switch stations are mounted in the most accessible places for the attendant, by means of brackets 163 which also carry portions of the conduit 176 provided for the conductors leading from the respective pendant-switch stations to the motor 166 and control panel 167.

Below the planer platen 160 and at the side of the table 169 is positioned a limit switch 6 having projecting levers 144 and 145. At the side of the platen are positioned a pair of lugs 147 and 148 which may be adjusted longitudinally of the platen 160 within grooves of T shape. The lugs and projecting levers are so disposed that lug 147 engages lever 144, and lug 148 engages lever 145 when the platen is reciprocating. On the lower face of the platen is positioned a rack 149 meshing with the bull-gear 150 driven by the reciprocating motor 166.

If it be assumed that the planer platen moves to the right, or in the cut direction, lug 147 actuates projecting lever 144 which initiates a dynamic-braking effect in the motor to stop the planer platen within a definite distance and, for any given platen speed, within a definite time after actuation of the projecting lever 144. As the planer platen moves to the left, or in the return direction, lug 147 again actuates projecting lever 144 and moves it to original position. A similar function is performed by the lug 148 and the projecting lever 145. It will be apparent that projecting levers 144 and 145 are always in a given position, the set position, when the planer platen is in a position intermediate the limits of travel determined by the positions selected for the lugs 147 and 148. When projecting levers 144 and 145 are in set position, contact members 31 and 33, and 109 and 111, respectively, are in circuit closing position, as will be explained in detail hereinafter.

Figure 3:
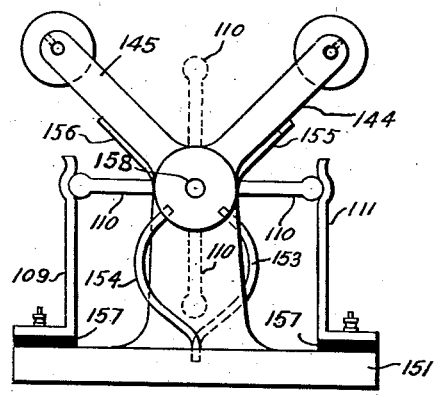

The details of the limit switch are shown diagrammatically in Figs. 3 and 4. The limit switch comprises a base 151 supporting a pair of bearing standards 152. Within the bearings is mounted a shaft 158 carrying contact member 32 at one end and projecting lever 144 at the other. Intermediate the bearings and rotatably supported on shaft 158 is a sleeve 159 carrying contact member 110 and projecting member 145. The contact members 31 and 33, and 109 and 111, are mounted, by means of insulation blocks 157, on the base 151 in position to be engaged by contact members 32 and 110, respectively. To hold the contact members 32 and 110 positively in open or in closed position, over-center springs 153 and 154 are secured to the base 151 and sleeve 159 and end of shaft 158, respectively. Different springs than those shown may, of course, be used or the springs may be dispensed with entirely if the projecting levers 144 and 145 are designed heavy enough or any kind of limit switch regardless of structure may be used provided it has substantially the function of the one above described.

The respective parts shown in Figs. 1 and 2, are shown in the positions they would occupy if no energy were applied to the circuits, that is, power switch PS is being considered in open position, as shown.

Upon closure of the power switch PS, a circuit is established which extends from positive line conductor 1, through the resistor 15 and magnetizing coil 16 of time-limit relay 3, to the negative line conductor 2. A second circuit in parallel with the one just mentioned is also established through resistor 17 and neutralizing coil 18 of time-limit relay 3.

The time-limit relay includes a core 20 of magnetic material, an armature 19 also of magnetic material, a tension adjusting means 21 for the armature, pivotally mounted spring-biased contact member 97 carrying an insulated contact member 25, a terminal binding post or contact member 98, and a contact member 24. The effect of the neutralizing coil 18 is opposite to the effect of the magnetizing coil 16 but their relative magnetic effect is such, when both are energized, that contact members 24 and 25 are in closed position, and contact members 97 and 98 are in open position.

The magnetizing coil 16 is provided with a shunt comprising conductor 77, contact members 78 and a short conductor to the negative line conductor 2. Upon closing of contact members 78, neutralizing coil 18, because of its influence on the decrease of magnetism in core 20, insures closing of contact members 97 and 98 a predetermined time after magnetizing coil 16 is shunted. The construction and design is such that the time-limit relay has a negligible time constant when coil 16 is energized, and movement toward the left of armature 19 is substantially instantaneous. It is, of course, understood that any time-limit relay, the time constant of which can be definitely adjusted, will serve equally as well as the specific embodiment shown and described, and applicants do not desire to be limited to the time-limit relay disclosed.

The subject matter of the time-limit relay just described is presented more in detail in the patent, No. 1,753,983, granted to Willard G. Cook on April 8, 1930.

Upon closing of the power switch PS and the consequent energization of magnetizing coil 16, as above pointed out, a circuit is established from the positive line 1, through conductor 23, contact members 24 and 25, conductor 26, actuating coil 27 of control relay 4 and conductor 30, to the negative line conductor 2. Energization of coil 27 closes contacts 29, thereby shunting the field resistor sections 92, 93, 94 and 135 by a circuit through conductor 28, contact members 29 and conductor 30. This shunt circuit will initially have no effect, since the shunt field circuit is still open, but it does make it possible to subject the shunt field windings to twice their rated voltage when, in a later sequence of operation, the shunt field circuit is closed.

Assuming that the planer platen is in the return position and the attendant wishes to start the planer platen for automatic operation in the cut direction, which in this embodiment, is toward the right in Figs. 5 and 6, then the attendant depresses push-button switch 36, thereby establishing a circuit from the positive line conductor 1, through contacts 31, 32 and 33, conductors 34 and 35, push-button switch 36 bridging contact members 37, conductor 38, contact members 39—bridged by the contact members on stop lever 40—conductor 41, contact members 42 of the overload circuit breaker 8 and actuating coil 43 of control relay 5, to the negative line conductor 2.

Upon the energization of actuating coil 43, contact members 44, 48 and 116 are closed, and contact members 56 are opened. Closure of contact members 116 does not establish a circuit, because push-button switch 36 is depressed, and contact members 114 stand open. The opening of contact members 56 renders the inch-cut and inch-return push-button switches ineffective, whereby an unauthorized or inadvertent actuation of these push-button switches will not establish a control circuit which will interfere with automatic operation.

Closure of contact members 44 establishes a holding circuit for actuating coil 43 which extends from the positive line conductor 1, through contact members 44, conductors 45 and 38, contact members 39—bridged by the contact members on stop lever 40—conductor 41, contact members 42 and actuating coil 43 of the relay 5, to the negative line conductor 2. The closure of contact members 48 establishes a circuit from the positive line conductor 1, through contact members 31, 32 and 33, conductor 34, contact members 159—bridged by push-button switch 46—conductor 47, closed contact members 48, conductor 49, actuation coil 50 of control relay 9, conductor 51, contact members 52 of directional contactor relay 12, conductors 53 and 54 and actuating coil 55 of main line contactor 10, to the negative line conductor 2.

The armature and contact members and the actuating coil 55 of the main line contactor are relatively heavy, and, to prevent all the current necessary to actuate the main line contact members from passing through actuating coil 50, a shunt resistor 123 is connected in parallel with the actuating coil 50.

Since the parts of control relay 9 are considerably lighter than the parts of relay 10, the energization of coil 50 will cause the actuation of control relay 9 an instant sooner than the actuation of relay 10. Actuation of relay 9 closes contact members 58 and 66. Closure of contact members 58 establishes a circuit from the positive line conductor 1, through conductor 57, contact members 58, conductors 59 and 60, actuating coil 61 of directional contactor 11 and conductor 62, to the negative line conductor 2. A coil 64 of the directional contactor 12 is connected, in parallel circuit relation, to actuating coil 61 by a circuit extending through conductor 63, coil 64 and conductor 65, to the negative line conductor 2. The effect of actuating coil 64 at this stage is merely to insure that contact members 52 and 83 of the directional contactor 12 are held in closed position.

An instant after the closure of contact members 58, the main line contactor relay 10 operates closing contact members 78 and 69 and opening contact members 103 and 107. Closure of contact members 69 establishes a circuit from the positive line conductor 1 through actuating coil 67 of over-load circuit breaker 8, conductor 68, contact members 69, conductors 70, 71 and 72, the series-parallel circuit through field-discharge resistor 73 and shunt field winding 74 and 75, conductor 76, conductor 28, contact members 29 and conductor 30, to the negative line.

The shunt field windings, being connected in parallel, present a circuit of low self-inductance, and, having all of its resistor sections short-circuited, is subject to a voltage much higher than its normal rating. It is thus apparent that the field of the motor may be made to build up very rapidly and also decrease very rapidly upon closing or opening of the circuit for the shunt field windings, as the case may be.

Closing of contact members 78 establishes a shunt circuit for the magnetizing coil 16 of time-limit relay 3, which circuit extends from the positive line conductor 1, through resistor 15, conductor 77, contact members 78, to the negative line conductor 2. The magnetism in armature 20 now proceeds to decrease, and the neutralizing coil 18 governs the rate of decrease. The neutralizing coil 18, in conjunction with the spring and its adjusting means 21, thus fix accurately the time of opening of contact members 24 and 25 and the closing of contact members 97 and 98 during an operation of elements hereinafter discussed.

It is a known fact that, when contact members are closed and opened on a circuit having a low resistance, welding of the contact members, if it occurs, takes place during the closing of the contacts and not during the opening of them. From the sequence of operations thus far discussed and the circuits established, it will be apparent that the main-line contact members 69 do not close on the low-resistance armature circuit but merely close on the shunt field windings and the circuit through conductor 28, contact members 29 and conductor 30. The current, therefore, passing through contact members 69 is comparatively small, and no welding can take place.

An instant after the closing of contact members 69, the energization of actuating coil 61 of directional contactor relay 11 closes contact members 79. A circuit is thereby established from the positive line conductor 1, which may be traced through coil 67, conductor 68, contact members 69, conductors 70, 71, and contact members 79, conductor 80, armature 81, conductor 82, contact members 83, conductors 84 and 85, series stabilizing field winding 86 and the starting resistor 87, to the negative line conductor 2.

In parallel-circuit relation to the motor armature 81 is disposed a conductor 88, actuating coil 89 and conductor 90. The energization of actuation coil 89, whether in one direction or another, always tends to oppose the action of actuation coil 55. The effect of coil 89, if no more than full-line voltage is impressed upon it, is negligible relative to coil 55, but, when coil 55 is deenergized, coil 89 does operate to force contact members 103 and 107 to closed position and contact members 69 and 78 to open position.

At the instant contact members 79 close, the armature starts rotating, and the attendant releases push-button 36.

The time interval between closing of contact members 69 and 79 is very small, and the field is thus still relatively weak when the armature circuit is closed. Since the shunt field windings present a circuit of low self-inductance, the field builds up very rapidly during initial stages of armature rotation, and the initial torque of the motor is very small and then rises rapidly as the field builds up and the counter electromotive force and the consequent drop in the armature current lag behind the building up of the field. The acceleration of the motor is thus very rapid.

While the motor is accelerating, time-limit relay 3 operates to close contact members 97 and 98, thereby establishing a circuit which extends from the positive line conductor 1, through contact members 44, conductor 45, contact members 97 and 98, conductor 99 and actuating coil 100 of control relay 13, to the negative line conductor 2.

Energization of relay 13 establishes a shunt circuit for the starting resistor 87, through conductor 101 and contact members 102, to the negative line conductor 2 a definite time after initiation of armature rotation. The shunting of the starting resistor further increases the armature current and the rate of acceleration of the motor.

Since the building up of the field flux cannot indefinitely keep ahead of the rise in counter electromotive force and the decrease in the armature current, a strong field flux would soon operate to reduce the speed of the armature. To prevent this, the contact members 24 and 25 are mounted on time-limit relay 3. The opening of these contact members causes the deenergization of the actuating coil 27, thereby opening contact members 29. Since contact members 66 still stand closed, resistor sections 92, 93 and a portion of section 94 are connected in the shunt field circuit. The field flux thus rapidly decays to a lower value, thereby further accelerating the motor.

The resistor sections 92 and 93 and that portion of section 94 not bridged by the conductors 95, contact members 66 and conductor 96 may be termed the cut rheostat, and function to determine the full constant speed of the planer platen in the cut direction.

The motor, at this stage, has accelerated to normal cutting speed, and the planer platen proceeds in the cut or forward direction at a comparatively slow speed. The speed may, of course, be adjusted to any desired value by the shifting of the conductor 95. As the planer platen proceeds in the cut direction and approaches the limit of travel for which lug 147 has been set, projecting lever 144 is tripped to the right (see Figs. 5 and 6), thereby opening contact members 31, 32 and 33.

The opening of the contact members 31, 32 and 33 deenergizes coil 55, thereby causing the opening of the main line contact members 69 and the closing of contact members 103 and 107. If the armature of the main line relay hesitates in its downward movement, the effect of actuating coil 89 is such as to rapidly close contact members 103 and 107 and to hold them firmly in place, since, at the instant of the opening of contact members 69, coil 89 is subject to the high voltage of the motor now acting as a generator.

The closing of contact members 103 establishes a main dynamic-braking circuit for the motor which extends from the right side of the armature 81, through conductor 80, contact members 79, conductors 71 and 70, contact members 103, conductor 104, series braking resistor 105, series dynamic-braking field winding 106, conductors 85 and 84, contact members 83 and conductor 82, to the armature 81. A minor dynamic-braking circuit is established which may be traced from the right side of the armature 81, through conductor 80, resistor 91, conductors 59 and 60 actuating coil 61 of directional contactor relay 11 in parallel with conductor 63, coil 64 and conductors 65 and 62, negative line conductor 2, contact members 102 of control relay 13, conductor 101, series stabilizing field winding 86, conductors 85 and 84, contact members 83 and conductor 82, to the other armature terminal. From this circuit, it is apparent that coils 61 and 64 are subject to a voltage of the same sign as the line voltage and that the directional contact members are held closed despite the fact that line voltage has been removed.

During the establishment of the circuits just discussed, another circuit having some dynamic-braking effect is established which extends from armature 81, through conductor 80, contact members 79, conductors 71 and 72, the series-parallel circuit through field-discharge resistor 73, and the parallel shunt field windings 74 and 75, conductor 76, contact members 107, negative line conductor 2 and then back to the other armature terminal, as explained above.

The deenergization of coil 55 and the consequent opening of contact members 78 removes the shunt around the magnetizing coil 16 of time-limit relay 3 and this relay operates to open contact members 97 and 98. The opening of contact members 97 and 98 causes the deenergization of actuating coil 100 of control relay 13. The operation of control relay 13 causes the opening of contacts 102 and thus the connection of the starting resistor into the dynamic-braking circuit.

The operation of the time-limit relay also causes the closing of contact members 24 and 25, thereby establishing a circuit extending from the positive line conductor 1, through conductor 23, contact members 24 and 25, conductor 26, actuating coil 27 of control relay 4 and conductor 30, to the negative line conductor. Energization of relay 4 closes contact members 29, thus establishing a shunt circuit for the shunt field resistor sections. This shunt circuit through conductor 28, contact members 29 and conductor 30 has, at this stage, no effect but merely establishes a desirable state of affairs for operations that are to take place during acceleration of the motor in reverse or return direction.

Since all the resistor sections for the shunt field windings are shunted and the shunt field windings 74 and 75, as well as the series dynamic-braking field windings 106, are subject directly to the generator action of the motor, the excitation and, in consequence, the field strength rises very rapidly. The field strength and voltage of the motor, acting as a generator, both rise cumulatively, and the retarding torque of the motor thus rises from a comparatively low value to a very high value. The speed of the armature rapidly decreases, and the consequent drop in voltage allows coils 61 and 64 to be deenergized, thereby opening contact members 79 and closing contact members 108.

The closing of contact members 108 establishes a second step in the dynamic-braking operation. The circuit closed extends from the armature 81, through conductor 80, contact members 108, conductor 84, contact members 83 and conductor 82 back to the armature. This second dynamic-braking circuit is of very low resistance value and, even though the motor be moving very slowly, the armature current will tend to be large. During the existence of this circuit, the shunt field windings 74 and 75 discharge through discharge resistor 73, and flux continues for a short interval of time. The motor develops a second impulse of retarding torque and stops almost instantly.

The instant directional contact members 79 open, the back contact members 121 close, thereby establishing a circuit from the positive line conductor 1, through contact members 109, 110 and 111, conductors 112 and 113, contact member 114 —bridged by push-button switch 36—conductor 115, contact members 116, conductors 117 and 118, actuating coil 119 of control relay 14, conductor 120, contact members 121, conductors 53 and 54 and actuating coil 55 of main line contactor relay 10, to the negative line conductor 2. The actuating coil 119 is provided with a shunt resistor 122 serving the same purpose for coil 119 as the shunt resistor 123, previously discussed, serves for coil 50.

Energization of control relay 14 causes the closing of the contact members 125 and 130. Closure of contact members 125 establishes a circuit from the positive line conductor 1, through conductor 57, conductor 124, contact members 125, conductor 126, actuating coil 127 of directional contactor relay 12, to the negative line conductor 2. In parallel with actuating coil 127 is disposed conductor 128, the lower actuating coil 129 of directional contactor relay 11 and conductor 62 to the negative line conductor 2. The energization of actuating coil 129 merely insures that contacts 108 and 121 remain closed during the sequence of operations hereafter discussed.

An instant after the closure of contact members 125, the contact members 69 of main-line relay 10 close. Again it should be noted that contact member 69 closes and the armature circuit remains open. The actuation of main-line relay 10 also closes contact members 78, thereby again deenergizing magnetizing coil 16 of the time-limit relay 3, and the movement of armature 19 will again close contact members 97 and 98 after a predetermined interval of time.

The closing of contact members 69 again establishes the circuit for the shunt field windings described hereinbefore. An instant after the closing of contact members 69, contact members 131 close and contact members 83 open. A circuit is thereby established through the motor armature to cause rotation in the return direction. This circuit may be traced from the positive line conductor 1, through actuating coil 67 of over-load circuit breaker 8, conductor 68, contact members 69, conductors 70 and 71, contact members 131, conductor 82, armature 81, conductor 80, contact members 108, conductors 84 and 85, series stabilizing field winding 86 and starting resistor 87, to the negative line conductor. At this instant, the motor starts rotating in the return direction, and the acceleration in the return direction follows substantially the same sequence as that discussed in connection with the initiation of the rotation in the cut direction.

During the initial stages of return movement, the lug 147, moving towards the left, (see Figs. 5 and 6) engages projecting lever 144, thereby closing contact members 31, 32 and 33. However, since contact members 52 stand open, no closed circuit is established by the closure of contact members 31, 32 and 33. The instant the directional contactor relay 12 is deenergized after the tripping of the limit switch by lug 148 engaging projecting lever 145, the control relay 9 and the main-line contactor relay 10 are again energized to cause automatic movement in the cut direction, after the dynamic braking at the return limit of travel has taken place in the manner previously discussed in connection with the limit of travel in the cut direction.

During the initial stages of armature rotation in the return direction, the field is comparatively weak but rapidly builds up to a relatively strong field. The contact members 130, at this stage of the operation, are closed and, when the shunt across the shunt field windings is removed as above discussed, only such portions of the shunt field resistor sections remain in series with the shunt field windings as are required for the high-speed return operation. Obviously, by shifting the conductor 134, a wide range of return speeds may be had. The speed range of the motor is especially flexible since, by shifting conductors 95 and 134 or one of them only, a cutting speed may be had which will be considerably higher than the minimum return speed.

It should be noted that, during the establishment of the second-step dynamic-braking circuit through contact members 83 and 108, the armature circuit is also closed through conductor 80, resistor 91, conductor 59, coils 61 and 64, negative line conductor 2, coils 127 and 129, conductor 126, resistor 132 and conductor 82, to the armature. By a proper choice of resistance values for coils 61, 64, 127 and 129, a dynamic-braking effect may be maintained until after the circuit for the return direction through contactors 108 and 131 has been established. The bull-gear 150 and rack 149 (Figs. 5 and 6), therefore, do not move relative to each other when the limits of travel are reached, and the reversal is smooth and noiseless.

The resistors 91 and 132 have a relatively low-resistance value and do not, in any material way, affect the operation of the circuits with which they are associated, except that they prevent the actuation of the wrong directional contactors upon depression of a starting button for operation in a given direction. For instance, during the automatic cutting operation discussed above, the resistors 91 and 132, upon the closure of contact members 58, limited the energization of coils 127 and 129 relative to the energization of coils 61 and 64. These resistors serve a similar purpose when contacts 125 close.

Assuming that the motor has been stopped and it is desired to inch the planer bed either in the cut or in the return direction, then, if it is desired to inch in the cut direction, push-button switch 139 is depressed establishing a circuit extending from the positive line conductor 1, through contact members 56, conductor 136, push-button switch 137, conductor 138, push-button switch 139 and conductor 140, to the conductor 49. The circuit extending from the conductor 49 to the negative line conductor and the sequence of operation above discussed when push-button switch 36 was depressed for automatic operation are identical. Furthermore, since the conductor 140 connects to conductor 49 at a point beyond the limit-switch contact members 31, 32 and 33, the automatic return push-button switch 46 and contactors 48, the inching operation is independent of the actuation of the limit switch, but, upon release of the inching-button switch, the stopping of the motor is always accomplished by the establishment of the dynamic-braking circuits discussed for automatic operation.

The inch-return-button switch establishes a circuit similar to the circuit established by the inch-cut button switch. Again it should be noted that conductor 143 is connected to conductor 118 beyond the contact members 109, 110 and 111 of the limit switch, the push-button switch 36 and contact member 116. The planer platen may thus be moved in the cut direction or in the return direction beyond the limits of travel fixed by the position of the lugs 147 and 148 on the planer platen 160.

From the foregoing discussion, it will be apparent that the motor always stops as if voltage had failed on the power-line conductors 1 and 2, and, in no case, can the planer platen exceed its limits of travel by reason of voltage failure. If the voltage fails while the planer platen is intermediate its limits of travel, coil 55 is deenergized, contacts 69 opened and the motor is stopped by the dynamic-braking circuit established. If the voltage fails while the planer platen is at its limits of travel, it is immaterial whether the contact members 69 opens because of voltage failure or whether it opens because of the actuation of the limit switch. In any case, the planer can not over-travel the limits for which it has been adjusted.

The invention is not to be restricted to the specific structural details, arrangement of parts of circuit connections herein set forth, as various modifications thereof may be effected without departing from the spirit and scope of this invention, and it is desired that only such limitations shall be imposed as are indicated in the appended claims.

We claim as our invention:

1. In a motor-control system, in combination, a reciprocating member, a motor for driving the member, a source of power, a main-line switch and reversing switches, control means for the main-line switch and the reversing switches, a dynamic-braking circuit controlled by said main-line switch and reversing switches, a single push-button control station giving complete control of the motor, and limit switches actuated by the reversing member for interrupting the application of voltage to the control means for the main line and reversing switches, thereby causing a dynamic-braking effect in the motor to stop the motor and thus the reversing member.

2. In a motor-control system, a reciprocating member, a motor for driving the member including a low-voltage parallel-wound shunt field winding, a series stabilizing winding, a starting resistor, a dynamic-braking resistor and a series dynamic-braking field winding, said shunt field winding and series dynamic-braking field winding being of low inductance and thus may build up and decrease rapidly, a main-line switch for closing the circuit of the shunt field winding, reversing switches, means for controlling the closing of the main-line switch and the reversing switches, said means causing the closing of the reversing switches and thus the armature circuit of the motor a very small interval of time subsequent to the closing of the main-line switch, whereby the building up of the field of the shunt field winding and the acceleration of the motor takes place at the same time.

3. In a motor-control system, in combination, a reciprocating member, a motor for driving the member, a forward limit switch and a reverse limit switch, said member, while moving forward, first actuates the reverse-limit switch to a set position and then actuates the forward limit switch to cause a cessation of the forward movement, whereupon the set reverse-limit switch causes reverse movement, and said member, while moving in reverse direction, first actuates the forward limit switch to set position and then actuates the reverse-limit switch to cause a cessation of the reverse movement, whereupon the set forward limit switch causes forward movement.

4. The method of reversing an electric motor which comprises initiating a dynamic-braking effect in the motor the instant the motor is disconnected from the source of supply for operation in one direction, maintaining the dynamic-braking effect until after the source of supply is connected to the motor for operation in the opposite direction, and supplying the motor with a rapidly rising and decreasing field during the dynamic-braking period, thereby very materially reducing the time of reversal of the motor.

5. The method of reversing an electric motor which comprises initiating a dynamic-braking effect in the motor the instant the motor is disconnected from the source of supply for operation in one direction, maintaining the dynamic-braking effect until after the source of supply is connected to the motor for operation in the opposite direction, supplying the motor with a rapidly rising field during initial stages of the dynamic-braking period, and supplying the motor with a field during the final stages of the dynamic-braking period which decreases substantially in accordance with the decrease in motor speed due to the dynamic-braking effect.

6. The method of reversing an electric motor which comprises initiating a dynamic-braking effect in the motor the instant the motor is disconnected from the source of supply for operation in one direction and maintaining the effect for substantially a predetermined time, supplying the motor sequentially with a rapidly rising and decreasing field during the dynamic-braking effect, initiating a second dynamic-braking effect in the motor, and energizing said motor for operation in the opposite direction during the continuance of the second dynamic-braking effect.

7. The method of accelerating an electric reversing motor supplied with energy which comprises supplying the motor with a comparatively weak field at the instant the motor is starting to rotate, rapidly building up the field to a relatively strong field ahead of the rise in counter-electromotive force, and rapidly decreasing the field to further increase the speed.

8. The method of accelerating an electric reversing motor supplied with energy which comprises supplying the motor with a comparatively weak field at the instant the motor starts rotating, rapidly building the field up to a comparatively strong field ahead of the rise in counter-electromotive force, maintaining the strong field for an instant to permit the counter-electromotive force to attain a predetermined value relative to the strong field, and rapidly decreasing the field to further increase the speed.

9. In a motor-control system, in combination, a reciprocating member, a motor for driving the member, a source of power for the motor, reversing switches for the motor, a main-line switch, limit switches operated by said member for controlling the reversing switches independently of the main-line switch, a circuit for energizing the main-line switch, and means for controlling said circuit to effect the opening of the main-line switch within a predetermined time interval after the operation of one of the limit switches in a predetermined direction.

10. The method of reversing an energized electric motor which comprises initiating a dynamic-braking effect in the motor the instant the motor is deenergized after being energized for rotation in one direction and maintaining the effect for a substantially predetermined time, supplying the motor sequentially with a rapidly rising and decreasing field during the dynamic-braking effect, initiating a second dynamic-braking effect and supplying the motor with a field during the period, the second dynamic-braking effect having a decrease unaffected by the rotation of the armature.

11. The method of reversing an energized electric motor which comprises initiating a dynamic-braking effect in the motor the instant the motor is deenergized after being energized for rotation in one direction and maintaining the effect for a substantially predetermined time, supplying the motor with a rapidly rising field during initial stages of the dynamic-braking period, supplying the motor with a field during the final stages of the dynamic-braking period which decreases substantially in accordance with the decrease in motor speed due to the dynamic-braking effect, initiating a second dynamic-braking effect the instant the first effect ceases, energizing the motor for operation in the opposite direction, during the continuance of the last stated dynamic-braking effect, and supplying the motor with a field during the period of the second dynamic-braking effect having a decrease which is unaffected by the rotation of the armature.

12. In a motor-control system, in combination, a motor, a source of power, a plurality of reversing switches for the motor, a main-line switch for the motor, means for controlling the operation of the reversing switches to cause the reversal of the motor after a predetermined number of revolutions in either direction, and means for controlling the operation of the main-line switch to effect its operation to disconnect the motor from the source of power upon failure of the reversing switches to open subsequent to the operation of the means for controlling the operation of the reversing switches.

13. In a motor-control system, in combination, a motor, a source of power, reversing switches for the motor, a main-line switch for the motor, means for controlling the operation of the reversing switches to effect a reversal of the motor after a predetermined number of revolutions in either direction, and means for controlling the operation of the main-line switch, said means being responsive to the operation of the means controlling the reversing switches and to the position of the reversing switches to effect the opening of the main-line switch within a substantially predetermined time interval subsequent to actuation of the reversing-switch control means.

14. In a motor-control system, in combination, a reciprocating member, a motor for driving the member, a source of power for the motor, reversing switches for the motor, a main-line switch, limit switches operated by said member for controlling the reversing switches independently of the main-line switch, and means cooperative with the limit switches for effecting the operation of the main-line switch, the character of the operation of the main-line switch being dependent upon the relative positions of the reversing switches and the limit switches.

15. In a motor-control system, in combination, a reciprocating member, a motor for driving the member, a source of power for the motor, reversing switches for the motor, a main-line switch, a limit switch for controlling the reversing switches independently of the main-line switch, and means rendered effective upon the operation of the limit switch to effect the opening of the main-line switch upon the failure of the reversing switches to open in response to the operation of the limit switch.

16. In a control system for a reciprocating member operated by a reversing motor, a source of power for the motor, reversing switches for the motor, a main-line switch, a limit switch operated in either a forward or a reverse direction by the reciprocating member and adapted to control the reversing switches, means rendered effective upon movement of the limit switch in the forward direction to cause a cessation of movement of the member in that direction, and means rendered effective upon movement of the limit switch in reverse direction to cause a movement of the member in the forward direction after movement of a predetermined distance in the reverse direction.

17. In a control system for a reversing motor, in combination, a reciprocating member, a reversing motor for reciprocating the member, a source of power for the motor, a main-line switch, reversing switches for the motor, a limit switch operated in either the forward or the reverse direction by said member and adapted to control the reversing switches, means rendered effective upon movement of the limit switch in the reverse direction to cause a cessation of movement of the member in that direction, and means rendered effective upon movement of the limit switch in the forward direction to cause a movement of the member in the reverse direction after movement of a predetermined distance in the forward direction.

GEORGE E. KING.
PHELAN McSHANE.
NELSON D. COOPER.
WILLIAM R. HARDING.